July 16, 1935.  W. C. HEDGCOCK ET AL  2,008,501
RAILWAY CAR TRUCK
Filed Dec. 15, 1928
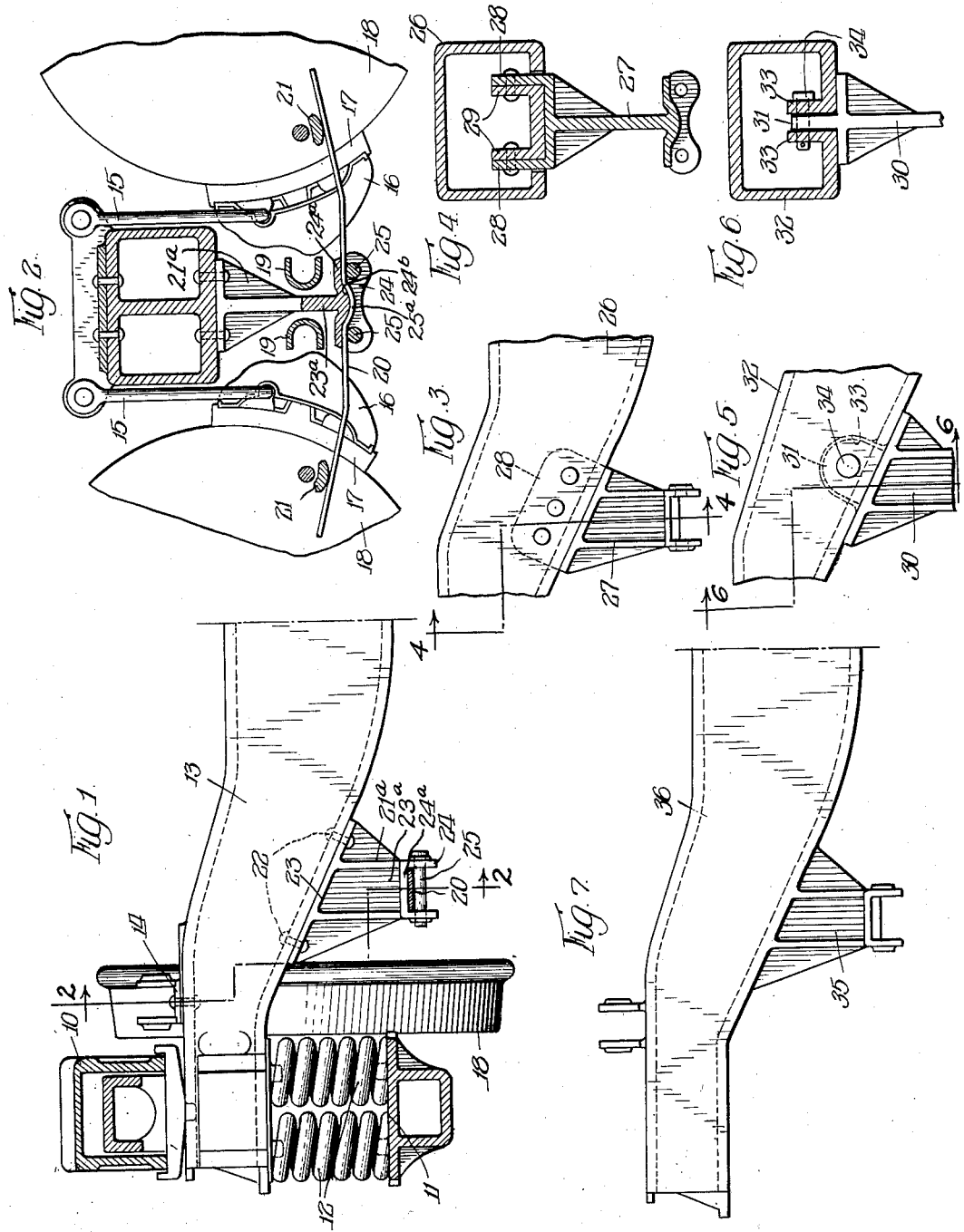
Inventors.
William C. Hedgcock,
Edwin George Busse,
By Wilkinson, Huxley, Byron + Knight
Attys Patented July 16, 1935

2,008,501

UNITED STATES PATENT OFFICE 2,008,501

RAILWAY CAR TRUCK

William C. Hedgcock and Edwin George Busse, Chicago, Ill., assignors to American Steel Foundries, Chicago, Ill., a corporation of New Jersey Application December 15, 1928, Serial No. 326,241

10 Claims. (Cl. 188—210)

This invention relates to railway car trucks, and more particularly to means for supporting and leveling brake beams carried by said car trucks.

One object of this invention is to provide simple, durable, reliable and inexpensive means for supporting brake beam safety and leveling members.

Another object is to provide a cooperative association between the bolster or load carrying member and brake beam safety and leveling means, which association is simple, economical and efficient.

Another object is to provide a car truck in which the various elements cooperate in a new and improved manner and in a manner to meet all of the requirements under service conditions.

These and other objects are accomplished by means of the arrangements disclosed on the accompanying sheet of drawings, in which—

Figure 1 is a fragmentary transverse sectional view of a railway car truck embodying our invention;

Figure 2 is a fragmentary sectional view of the same truck taken in the plane of line 2—2 of Figure 1;

Figure 3 is a fragmentary detail sectional view of a bolster and support for brake beam safety and leveling means embodying a modification of our invention;

Figure 4 is a sectional view taken in the plane of line 4—4 of Figure 3;

Figure 5 is another detail view similar to that shown in Figure 3, embodying a further modification of our invention;

Figure 6 is a sectional view taken in the plane of line 6—6 of Figure 5; and

Figure 7 is a fragmentary detail view of a bolster showing another modification of the brake beam safety and leveling means support.

The various novel features of the invention will be apparent from the following description and drawing, and will be particularly pointed out in the appended claims.

Referring to the figures of the drawing, it will be noted that the invention is illustrated in connection with a railway car truck having oppositely arranged side frames 10 each of which is provided with the usual bolster opening, the floor 11 of which forms a seat for springs 12 upon which the associated end of the bolster 13 is mounted. Adjacent the side frames 10 and on the upper side of the bolster 13 there are provided brackets 14 from which hangers 15 extend, the lower ends of said hangers being pivotally connected to brake heads 16 carrying brake shoes 17 which are adapted to be applied to the treads of the truck wheels 18 for braking purposes. The brake heads are operatively connected to opposite ends of brake beams 19 under which are located brake beam safety and leveling bars 20, the outer ends of which are tilted slightly upwardly and are slidably engaged by shoes 21 carried by suitable portions of the brake beams. As a result thereof, not only do the members 20 serve to prevent the brake beams from falling to the tracks in the event that they are torn from their normal hangings, but also serve to guide the brake beams in a manner whereby the braking surfaces of the brake shoes 17 at all times are parallel with the treads of the associated truck wheels.

This invention relates particularly to means for carrying or supporting the brake beam safety and leveling members 20. Referring first to Figures 1 and 2, it will be seen that such means takes the form of brackets 21a which are secured to the under side of the upwardly and outwardly inclined portions of the bolster 13 at points adjacent the side frame 10 by rivets 22. Said brackets have inclined portions or securing portions 23 which conform to the associated inclined portions of the bolster. The lower portion or head of each of said brackets is provided with spaced downwardly and laterally extending apertured ears or portions 24 for the reception of pins 25 which hold said brake beam safety and leveling members in operative position on a seat portion 24a between said ears, the lower portion being connected to said portion 23 by a shank 23a. The seat portion 24a is provided with an offset portion 24b interfitting with a complementary offset portion 25a of said brake beam safety and leveling member 20. In this way, the brake beam safety and leveling members 20 are properly supported for performing their functions. The brackets 21a thus provided are simple, inexpensive and durable and meet the requirements under service conditions.

In Figures 3 and 4, a modification is shown in which there is secured to the bolster 26 similar brackets 27, each of which however has projections 28 which extend through openings or cut-out portions in the under side or chord of the bolster and cooperate with corresponding projections 29 on the inside of the bolster through which projections 28 and 29 rivets are passed and secured for supporting the brackets 27 in proper position.

In Figures 5 and 6 another modification is shown in which the bracket 30 has a single projection 31 which extends upwardly through an opening or cut-out portion in the under side or chord of the bolster 32, which projection is secured to internal bolster projections 33 by a single immovable pin 34.

In Figure 7 another modification is shown which is quite similar to the arrangement shown in Figures 1 and 2, with the exception however that the brackets 35 are integrally formed with the bolster 36.

By means of the arrangements herein disclosed the objects of the invention are accomplished.

It is our intention to cover all modifications of the invention falling within the spirit and scope of the appended claims.

We claim:

1. In a truck, the combination of a load carrying member having a chord, said chord having a cut out portion, and a securing flange disposed adjacent said cut out portion and extending therefrom.

2. In a wheeled railway car truck, the combination of a bolster extending between the side frames of the truck and located between pairs of wheels of the truck, a brake beam for a pair of said wheels disposed adjacent said bolster, said bolster being provided with spaced openings having securing flanges adjacent thereto, and a bracket having securing flanges extending within said openings and disposed adjacent and secured to said securing flanges, said bracket having a member adapted to be disposed below said brake beam.

3. In a wheeled railway car truck, the combination of a bolster extending between the side frames of the truck and located between pairs of wheels of the truck, a brake beam for a pair of said wheels disposed adjacent said bolster, said bolster being provided with an opening having a securing flange adjacent thereto, and a bracket having a securing flange extending within said opening and disposed adjacent and secured to said securing flange, said bracket having a member adapted to be disposed below said brake beam.

4. A bracket construction for a brake beam support comprising a shank having a securing portion thereon, a head having spaced portions and a seat portion, spaced securing members in said spaced portion, a resilient member adapted to be positioned between said securing members and said seat portion, and an offset portion on said seat portion adapted to interfit with a complementary portion in said resilient member to prevent unauthorized dissociation of said resilient member and said seat portion.

5. In a wheeled car truck, the combination of a pair of side frames, a bolster extending between said frames, brake beams for said wheels and supported by said bolster, and brake beam safety and leveling means supported by said bolster and adapted to support said brake beams upon accidental displacement thereof.

6. In a wheeled car truck, the combination of a pair of side frames, a bolster extending between said frames, means associated with said bolster for tying said side frames together, brake beams for said wheels supported by said bolster, and brake beam safety and leveling means supported by said bolster adapted to support said brake beams upon accidental displacement thereof.

7. In a car truck, the combination of a load carrying member provided with a cut-out portion defined by oppositely disposed securing flanges, and a bracket member having a securing flange insertable into said cut-out portion and between said flanges and adapted to be connected thereto.

8. In a car truck, the combination of a load carrying member provided with spaced cut-out portions, and a bracket member having portions insertable into said cut-out portions, and means for securing said portions to said load carrying member.

9. In a car truck, the combination of a load carrying member provided with spaced cut-out portions, said load carrying member having securing flanges disposed adjacent said cut-out portions, and a bracket member having securing flanges insertable into said cut-out portions and disposed adjacent said securing flanges of said load carrying member, and means for connecting said flanges together.

10. In a wheeled car truck, the combination of a pair of side frames, a load carrying member movable up and down in respect to said wheels and extending between said frames, brake beams for said wheels supported by said load carrying member, and brake beam safety and leveling means supported by said load carrying member and adapted to support said brake beams upon accidental displacement thereof.

WILLIAM C. HEDGCOCK.
EDWIN GEORGE BUSSE.